(12) United States Patent
Eagle et al.

(10) Patent No.: US 7,877,082 B2
(45) Date of Patent: Jan. 25, 2011

(54) COMBINED SHORT RANGE RADIO NETWORK AND CELLULAR TELEPHONE NETWORK FOR INTERPERSONAL COMMUNICATIONS

(75) Inventors: Nathan Norfleet Eagle, Boston, MA (US); Alex Paul Pentland, Lexington, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 726 days.

(21) Appl. No.: 11/122,630

(22) Filed: May 5, 2005

(65) Prior Publication Data
US 2005/0250552 A1 Nov. 10, 2005

Related U.S. Application Data

(60) Provisional application No. 60/568,482, filed on May 6, 2004.

(51) Int. Cl.
*H04M 3/42* (2006.01)
(52) U.S. Cl. .................. 455/414.1; 455/432.3; 455/567; 455/412.2
(58) Field of Classification Search ........... 455/567, 455/412.1, 412.2, 466, 550.1, 463.3, 414.1, 455/517, 518, 552.1; 370/328, 338
See application file for complete search history.

(56) References Cited

U.S. PATENT DOCUMENTS

| 6,549,768 | B1* | 4/2003 | Fraccaroli | 455/456.3 |
| 6,968,179 | B1* | 11/2005 | De Vries | 455/414.1 |
| 7,418,268 | B1* | 8/2008 | Cabano et al. | 455/518 |
| 2002/0082054 | A1* | 6/2002 | Keinonen et al. | 455/567 |
| 2003/0036350 | A1* | 2/2003 | Jonsson et al. | 455/41 |

OTHER PUBLICATIONS

"Specification of the Bluetooth System", V 2.0, p. 15, Sec. 1.2: Nomenclature, p. 163, Sec. 8.4: Device Discovery Substrates, lines 1, 11-14, p. 185, Sec. 3.2.1.1 Definition, Nov. 4, 2004.*
"Introducing Bluetooth", http://media.wiley.com/product_data, Jan. 31, 2002.*

* cited by examiner

*Primary Examiner*—Jean A Gelin
(74) *Attorney, Agent, or Firm*—Charles G. Call (57) ABSTRACT

Portable communication devices, such as Bluetooth enabled cellular phones, communicate with and identify like devices that are nearby, and send notification messages to a remote server. When a notification message is received at the server identifying two devices that have come within range of one another, the server compares the profile data associated with each of the two identified devices and facilitates communications between the devices when appropriate.

19 Claims, 2 Drawing Sheets

COMBINED SHORT RANGE RADIO NETWORK AND CELLULAR TELEPHONE NETWORK FOR INTERPERSONAL COMMUNICATIONS

CROSS REFERENCE TO RELATED APPLICATIONS

This application is a Non-Provisional of, and claims the benefit of the filing date of, U.S. Provisional Patent Application Ser. No. 60/568,482 filed May 6, 2004, the disclosure of which is incorporated herein by reference.

FIELD OF THE INVENTION

This invention relates to systems for facilitating direct communications between consenting persons having similar interests.

SUMMARY OF THE INVENTION

In its preferred form, the present invention employs body-worn personal networking devices, such as Bluetooth enabled cellular phones, that are able to communicate with and identify other such devices that are nearby. When a device is within range of another such device, it identifies itself with unique identification value, such as a Bluetooth device address value.

Each cellular phone keeps a log of other devices that have been previously detected and, whenever a new device comes within range, a notification message is transmitted to a remote server via the long-range cellular phone network. The notification message contains an identification of both the requesting device and the nearby device whose presence has been detected. It may also include one or more values indicating the operating mode of the requesting device, e.g., a silent mode, an invisible mode, a meeting mode, etc. In addition, the transmitted indication preferably includes a value which indicates the user's willingness to receive alert messages from the server when new devices come within range.

Profile data that describes each device and its owner is stored in a database. When a notification message is received identifying two devices that have come within range of one another, the server fetches the profile data associated with each of the two identified devices and performs a comparison. The comparison generates a calculated value indicating the extent to which the two profiles match. This comparison operation may use different weighting schemes depending on the mode of the requesting device to determine the type of interaction to enable.

If the calculated value indicating the extent to which the two profiles match exceeds a threshold value currently associated with a given device, an alert message is transmitted to that device. The user of each device may alter the mode and threshold values to change the behavior of the device.

The alert message sent to each device from the server may contain information describing the nearby device to the extent the owner of that device has consented to its being revealed. Each person supplying profile information can supply preference values indicating the extent to which provided information is shared, and each person can provide a threshold value indicating the extent to which the profile of a detected nearby device must match the interests of the requestor before an alert message is to be sent. The alert message may include information identifying an encountered device or its owner, such as name, address or other contact information, a photograph or other descriptive image, demographic data, data indicating the interests of the owner of the device, or any other information which is of use in a specific application to identify, or promote communications between, nearby devices and their owners.

The present invention can exploit the growing availability of portable wireless electronic devices that incorporate Bluetooth transceivers that can be used as beacons to identify a device to other nearby devices. Such personal beacon systems offer better short range spatial resolution for proximity detection than do absolute location systems, such as GPS and cellular phone location systems. The fact that the beacons transmit only device identification codes avoids some privacy problems since these codes do not contain information about the users. Moreover, the detection and introduction service contemplated by the present invention can also be used in poor reception areas, where only asynchronous communications such as SMS (Short Message Service) function properly.

The storage of profile data, the performance of matching functions, message transmission, and other functions at a shared central server offers several advantages over systems which rely on the portable devices themselves for storing and sharing information. The performance of functions using a centralized infrastructure reduces the computational burden and consequent power consumption to which the battery powered portable devices are subjected. The centralized structure can be more easily updated and is capable of performing more sophisticated comparison and notification functions using more complete data. The robust capabilities of web servers, applications servers and database servers may be used to advantage to provide better performance from the individual devices, as well as functions such as improved privacy protection, profile editing, report generation, data analysis and system management functions not possible using the limited capabilities of the portable devices alone.

The preferred embodiment of the present invention described in more detail below uses personal area wireless network devices such as Bluetooth transceivers to identify social proximity and a large area wireless network such as a cellular phone network and/or the Internet, to permit interest matching functions to be performed at a remote central server and to instigate person-to-person interactions between selected devices that are near to each other and/or between their users.

The preferred embodiment of the invention contemplates the use of body-worn personal area wireless devices interconnected with a server by a long-range network to map social networks and social network dynamics. This enables verification and automatic augmentation of the links in existing social network applications such as Tacit.com, friendster.com and Match.com which are already in widespread use. These rapidly growing Internet based applications currently suffer from a problem that they obtain their data from users who enter that data at the keyboards of connected PCs, but they lack the ability to (1) add links automatically, and (2) verify that the links are based on a selection criteria that is useful to service users. The present invention supplies that need by providing an automatic mechanism for establishing and verifying links automatically between people who are physically near to one another.

In accordance with a feature of the preferred embodiment of the invention, service users can also associate weighting values with the information about themselves and others, and use these weighting values to specify the information's importance to be assigned to different data when calculating a similarity metric. The similarity score is calculated by extracting the commonalities between two users' profiles and summed using the user-defined weighting values. If the similarity score is above the threshold set by one or both users, the server alerts the users that there is someone in their proximity that they would like to meet. The thresholds and the weighting scheme that defines the similarity metric can be specified using a web interface and can be reset as needed using a cellular phone. The user can also vary the mode of operation of the cellular phone to control the frequency and content of the alert messages that are transmitted by the server when different devices come within range of one another.

These and other features, advantages and potential applications of the present invention will be better understood by considering the following detailed description.

BRIEF DESCRIPTION OF THE DRAWINGS

In the detailed description which follows, frequent reference will be made to the attached drawings, in which.

DETAILED DESCRIPTION

Portable Device Operation

In the illustrative embodiment of the invention described in detail below, people who use the system are provided with cellular telephones which incorporate short range radio transceivers that use the Bluetooth protocol to detect other nearby Bluetooth enabled devices.

Figure 1A:
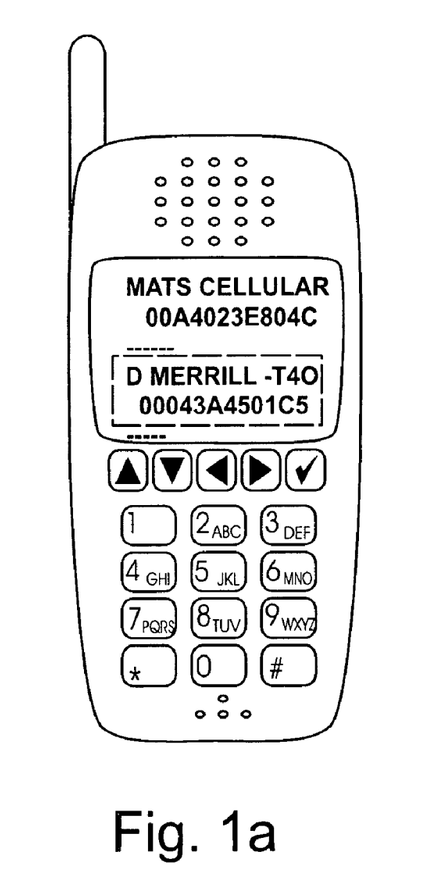
FIGS. 1a, 1b, and 1c illustrate cellular phone screen displays produced in the course of operating an illustrative preferred embodiment of the invention.

Each of these Bluetooth enabled cellular phones includes a processor that is specially programmed with an application program, called "BlueAware," that enable the cellular phone to identify and log the presence of other "discoverable" Bluetooth devices that are nearby, and to display an identification of those devices on the cell phone's screen as illustrated in FIG. 1a.

Each of these cellular phones is further programmed to generate a notification message identifying itself, and other Bluetooth devices that come within its range, as well as additional status information. The application program that executes on the cellular phone processor then transmits that notification message via the long-range cellular network to a remote central server. The remote server processes these incoming notification messages by consulting a database of profile information about each participating device and its owner (as used herein, the term "owner" is used to refer to the person who uses the device and who supplies profile information about themselves to the central server.) When the remote server receives a notification message indicating that two identified devices are within Bluetooth range of one another, and further determines that the profile data associated with these two devices satisfies a specified matching criteria, the remote server sends an alert message to one or both of the two identified nearby devices.

Figures 1B, 1C:
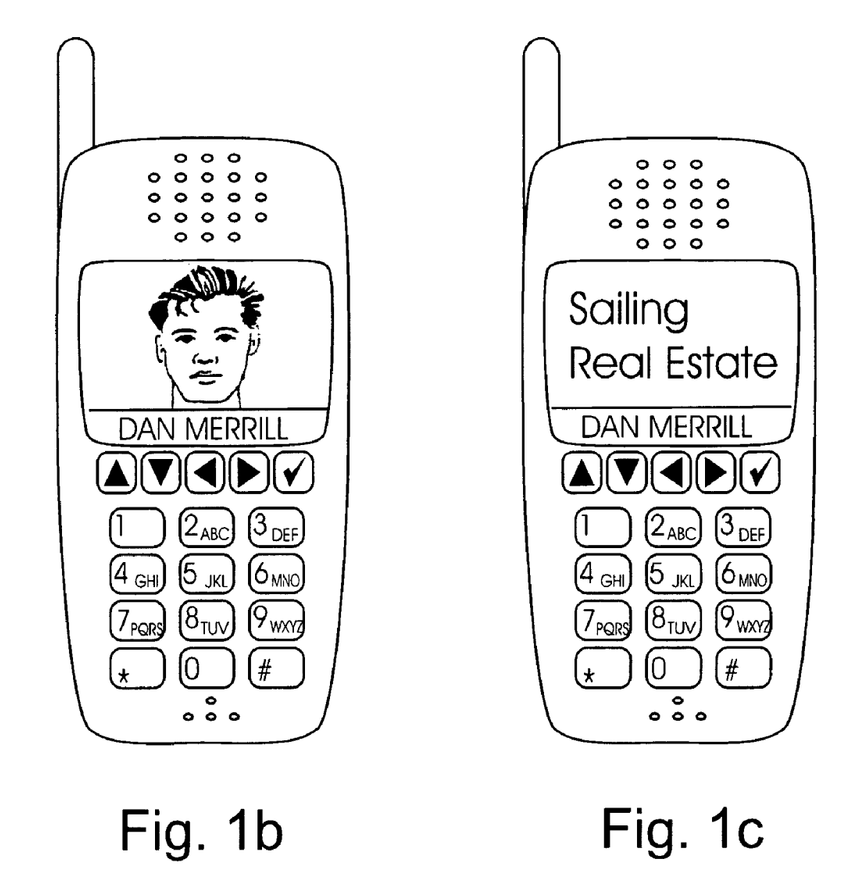

As illustrated by FIG. 1b, the alert message may advantageously include a picture of the owner of the matching nearby device that is displayed on the cellular phone's screen after the alert message is received, facilitating a personal contact between the two nearby device owners. In addition, as illustrated in FIG. 1c, the alert message may include displayable data indicating common interests of the two nearby users.

Figure 2:
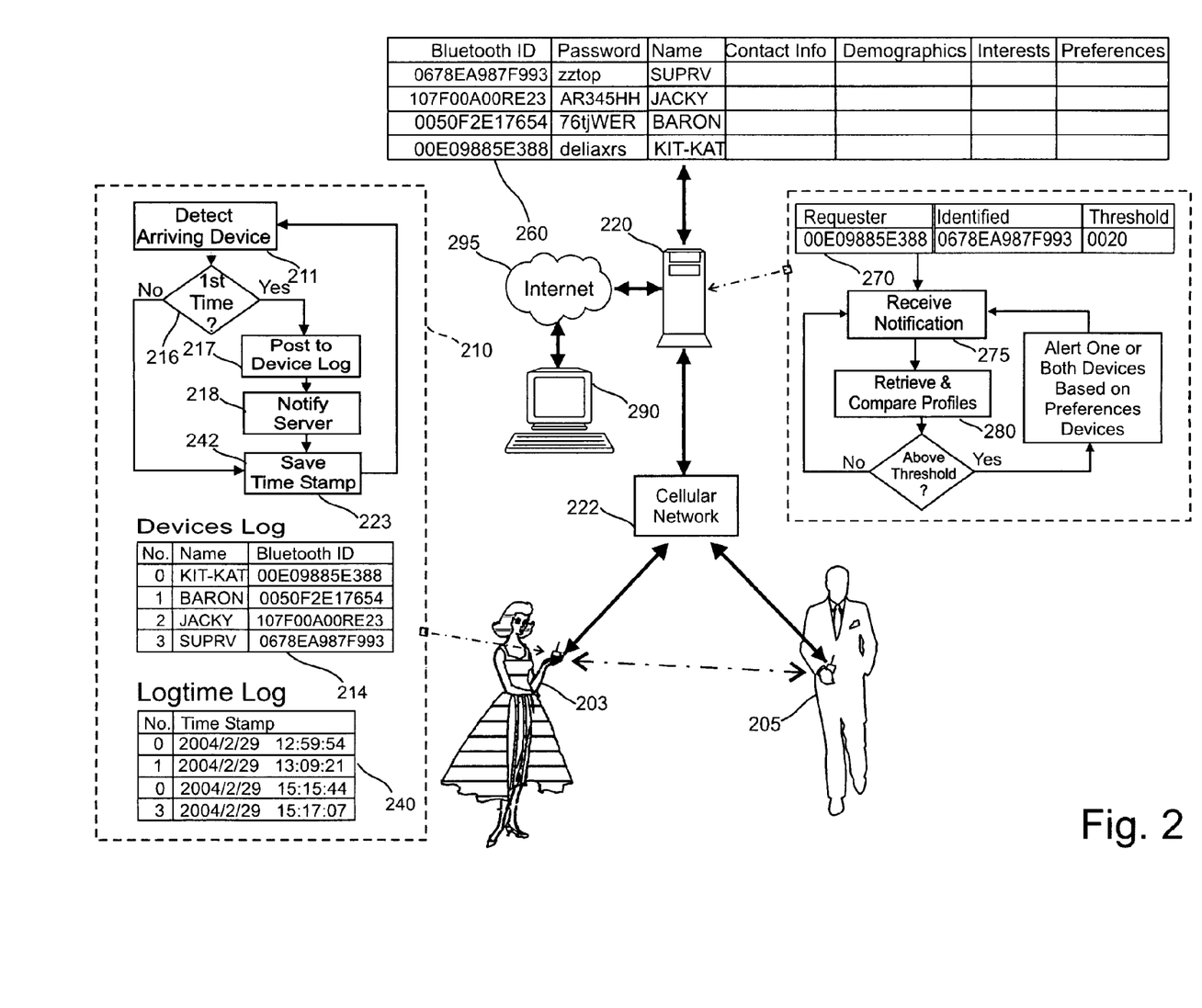
FIG. 2 is a block diagram that illustrates the principal components of a system that implements the invention.

FIG. 2 shows the operation of the overall system. A first individual 203 carries a first Bluetooth phone which detects a second Bluetooth phone carried by a second individual 205. The BlueAware application program that executes on the Bluetooth phone carried by the first person 203 id illustrated in simplified form within the dashed-line rectangle 210 in FIG. 2. As seen at 211, when the presence of a nearby device is detected, its Bluetooth device ID (a unique 48 bit Bluetooth device address value assigned to and stored on each device) is compared with the Bluetooth ID's previously stored in a Devices Log data structure seen at 214 maintained by the BlueAware program.

If it is determined at 216 that a detected nearby device has newly come within range and not currently identified in the Devices Long 214, its Bluetooth ID is posted at 217 as a new Devices Log entry and a request message is sent as indicated at 218 to a remote server, seen at 220 in FIG. 2, via the cellular phone network 222. The time at which the new device was detected is recorded as seen at 223 in a Logtime Log 240 which holds a device identification number (from the Devices Log) and a time stamp value. If the detected device is already recorded in the Devices log 214, a timestamp indicating the time of detection is recorded in the Logtime Log 240, along with the device number assigned to that device in the Device Log 214.

Using the mechanism described above, a sequence of timestamp values may be recorded for each device encountered, and the BlueAware application may process this data to determine whether the detection of a given device warrants the transmission of a notification message to the server. To conserve memory space, the BlueAware application may periodically remove identification and timestamp data for devices which have been out of range for an extended time.

Thus, the proximity log is split into two files, the Devices Log 214 listing ID values (device addresses and device names) and the Logtime log 240 listing timestamps. The Devices Log 214 indexes every device encountered by the phone. The individual encounters are timestamped and linked to the indexed number of the device in the Logtime log 240. Simply assigning a single number to each device eliminates the need to log the BTID and device name after each encounter. This method was shown to dramatically lower the size of the proximity log. Example data of the kind that might be recorded in the two proximity logs is listed in Table 1, below.

TABLE 1

Logging information format

BTdevices.log
  0 [name] KIT-KAT        [addr] 00e09885e388
  1 [name] BARAHONA-IBM  [addr] 0050f2e17654
  2 [name] Nokia3650      [addr] 0060573c1c4e
  3 [name] NORTHOLT      [addr] 000d888ea558
BTlogtime.log
  0 <2004/2/29 12:59:54>
  1 <2004/2/29 12:59:54>
  2 <2004/2/29 12:59:54>
  3 <2004/2/29 12:59:54>

Continually scanning and logging the environment for BTIDs can expend an older mobile phone battery in about 18 hours. While continuous scans provide a rich depiction of a user's dynamic environment, most individuals are used to having phones with standby times exceeding 48 hours. Therefore, the BlueAware application program that executes on each cellular phone scans the environment once each minute to reduce battery consumption.

Bluetooth Identification of Nearby Devices

Bluetooth transceivers that are typically built into a single microchip and operate within a globally available frequency band. Detailed information on the structure and function of devices conforming to the Bluetooth protocol can be found at www.bluetooth.org. Programmable cellular phones are also widely available that incorporate programmable processors which execute the Symbian Operating System. The Symbian OS is the global industry standard operating system for smartphones, and is licensed to the world's leading handset manufacturers, which account for over 80 percent of annual worldwide mobile phone sales. The Symbian OS is available from Symbian Software, Bridge Park Center, 390 Bridge Parkway, Redwood Shores, Calif. 94065. Cellular phones incorporating Bluetooth transceivers and using the Symbian OS are currently available from many cellular phone manufacturers, including Nokia, Motorola, Sony Erickson, Panasonic and Lenovo, and are in widespread use.

The application program (here called "BlueAware") that runs on each cellular phone can be downloaded from a server operated by the service provider via the cellular network, or may be transferred via the Bluetooth link or an infrared link from a friend's device, or from a device provided at an entryway to an event, such as the registration desk of a tradeshow. After the BlueAware software has been newly installed on a give device, it can automatically register itself with the remote server, transferring its Bluetooth device address and device name to the server, and creating a profile data template which can then be populated with data by the device owner using the cellular phone or using a PC as illustrated by the PC 290 seen in FIG. 2 which is connected to the server via the Internet 295.

The Bluetooth specification defines two power levels: a lower power mode with a range of about 10 meters for covering a personal area within a room, and a higher power level with a range of about 100 meters covering a larger area, such as a home or office. Software controls and identity coding built into each microchip ensure that only those units preset by their owners can communicate, and provide a mechanism for identifying other devices that are within range. In a crowded room, the effective range of Bluetooth low power transmission may decrease substantially from the nominal 10 meter range—but reduced range in a crowded room can frequently be beneficial.

Bluetooth devices are identified by a unique identification code values. Each Bluetooth device is specified by a unique 48-bit Bluetooth Device Address (BD_ADDR), which is typically displayed as 12 hexadecimal digits as seen in Table 1 above. Each Bluetooth device further stores and can reveal a "user friendly" displayable Bluetooth Device Name which can be up to 248 bytes long, although external devices are not expected to be able to handle or display more than 40 characters. Still further, each device is assigned a Bluetooth passkey (Bluetooth PIN) which is used to authenticate two Bluetooth devices (that have not previously exchanged link keys) to each other and create a trusted relationship between them.

Bluetooth devices are further specified by a Class of device parameter received during the device discovery procedure and indicating the type of device and the types of service that are supported. The information within the Class of Device parameter is referred to as 'Bluetooth Device Class' (i.e. the major and minor device class fields) and 'Bluetooth Service Type' (i.e. the service class field).

Bluetooth devices are capable of performing an inquiry function to determine the identity and Device Class of other "discoverable" Bluetooth devices which are in range. With respect to inquiry, a Bluetooth device shall be either in non-discoverable mode or in a discoverable mode; that is, the device shall be in one, and only one, discoverability mode at a time. The two discoverable modes are called limited discoverable mode and general discoverable mode. When a Bluetooth device is in non-discoverable mode it does not respond to inquiry. A Bluetooth device is said to be made discoverable, or set into a discoverable mode, when it is in limited discoverable mode or in general discoverable mode. Even when a Bluetooth device is made discoverable it may be unable to respond to inquiry due to other baseband activity. A Bluetooth device that does not respond to inquiry for any of these two reasons is called a silent device.

Bluetooth devices are capable of performing different types of inquiries called (1) a general inquiry, (2) a limited inquiry, (3) a name inquiry, (4) device discovery, and (5) bonding. The purpose of the general inquiry procedure is to provide the initiator with the Bluetooth device address, clock, Class of Device and used page scan mode of general discoverable devices (i.e. devices that are in range with regard to the initiator and are set to scan for inquiry messages with the General Inquiry Access Code) Also device in limited discoverable mode will be discovered using general inquiry. The general inquiry is intended to be used by devices that need to discover devices that are made discoverable continuously or for no specific condition.

The purpose of the limited inquiry procedure is to provide the initiator with the Bluetooth device address, clock, Class of Device and used page scan mode of limited discoverable devices. The latter devices are devices that are in range with regard to the initiator, and may be set to scan for inquiry messages with the Limited Inquiry Access Code, in addition to scanning for inquiry messages with the General Inquiry Access Code. The limited inquiry is intended for use by devices that need to discover devices that are made discoverable only for a limited period of time, during temporary conditions or for a specific event.

The purpose of name discovery is to provide the initiator with the Bluetooth Device Name of connectable devices (i.e. devices in range that will respond to paging). A Name request is the procedure for retrieving the Bluetooth Device Name from a connectable Bluetooth device. It is not necessary to perform the full link establishment procedure in order to just to get the name of another device. In the name request procedure, the initiator will use the Device Access Code of the remote device as retrieved immediately beforehand, normally through an inquiry procedure.

The purpose of device discovery is to provide the initiator with the Bluetooth Address, Address, clock, Class of Device, used page scan mode and Bluetooth device name of discoverable devices. During the device discovery procedure, first an inquiry (either general or limited) is performed, and then name discovery is done towards some or all of the devices that responded to the inquiry.

A Bluetooth enabled cellular phone programmed with the BlueAware application identifies and stores the device addresses and the device names in the devices log seen at 214 and can display a listing of the recently identified nearby devices as seen in FIG. 1*a*. The content of the devices log is further illustrated above in Table 1.

The preferred Bluetooth enabled cellular phone is also capable of exchanging data with a remotely located server via the cellular network using GPRS (General Packet Radio Service), a standard for wireless communications which runs at speeds up to 115 kilobits per second, compared with current GSM (Global System for Mobile Communications) systems' 9.6 kilobits. GPRS supports a wide range of bandwidths, makes efficient use of limited bandwidth, and is particularly suited for sending and receiving small bursts of data, such as e-mail and Web browsing, and for transmitting the notification and alert messages employed by the present invention.

A Bluetooth enabled cellular phone or other wireless device connects to the server using GPRS by transmitting a notification message containing that devices Bluetooth device address, the Bluetooth device address of a nearby discovered device, and a mode/threshold value. For example, the device might submit the request:

http://18.85.44.254/serendipity/php/
px.php?myBTID=BTID&myThres=Thres&rBTID=rBTID where BTID and rBTID are expressed as the 12 hexadecimal digits representing the 48 bit Bluetooth device address values of the requesting device and the recognized device respectively.

The server may, by way of example, execute a specified perl script that executes on an application server and takes the BTID and threshold variables received from the phones and connects to a MySQL database to fetch and compare the profile data associated with the two devices, yielding a calculated similarity score between the two users. If this score is above one or both users' thresholds, the script returns the commonalities as well as additional contact information (at each user's discretion) back to the phones.

For many applications, the phones will need to connect via the GPRS network. Unfortunately, in locations such as within many large building, GPRS signals cannot be relied on. To ensure connectivity, the service may provide Bluetooth access points which connect the devices to the GPRS network. In other situations, notification and alert messages may be sent using the SMS (Short Message Service) available on digital GSM networks to allowing text messages of up to 160 characters to be sent and received. If the phone is powered off or out of range, SMS messages are stored in the network and are delivered at the next opportunity.

Server Operations

The functions performed at the remote server 220 are illustrated within the dashed-line rectangle 250 in FIG. 2.

Participating Bluetooth device users provide profile information along with the Bluetooth identification values (BTIDs) to populate a profile database illustrated at 260 in FIG. 2. The data in the profile database may be entered using an HTML forms-based procedure Using an assigned user name and password, a user accesses a secure web site which provides a forms based interface for entering and editing profile information the describes a Bluetooth enabled cellular phone (typically including its cellular phone number and its 48 bit Bluetooth device address). The form also enables the user to enter descriptive information about the device user, including a photograph (typically a .jpg image file uploaded to the server), as well as bibliographic data about the user (e.g., name, address, gender, schools attended, and occupation). In addition, the user specifies a set of interests. Preferably, the interests are selected from a hierarchically organized collection of predetermined interest categories so that the interests of different people may be more easily matched. When a user wishes to specify an unlisted category, he or she may do so, and an editor may periodically review these new categories and, when appropriate, add them to the organized collection.

As shown in FIG. 2, the user may use an available personal computer 290 connected to a web server via the Internet 295 to populate the profile database. As will be understood, the functions performed by the remote server may be performed by a plurality of different server processes which execute on one or several different computes and would typically include a web server, an application server and a database server. The remote server may also advantageously provide a WAP (Wireless Application Protocol) interface that allows the users of cellular phones and other wireless devices to easily and instantly access and interact with information and services provided by the server.

The user may also associate a "level of interest" weighting value that can be used in a matchmaking process performed by the server to better identify other participants with whom direct communications are likely to be rewarding. A user named "Martin Semoury" may associate a low weight value to the data indicating his birthday, but assign a high weight to the name of his college, thereby indicating that he wishes to know when people who also attended Stanford are nearby, regardless of their age.

A user may enter a threshold value that indicates how high the calculated similarity score should be before the server is to send an alert message to that user. Martin Semoury may enter a low threshold value of 1, indicating that he desires to receive alert messages even when the profile analysis performed by the server suggests that the user of a detected nearby device has few common interests. The threshold value may be, and commonly is, dynamically reset by the individual user, depending on the users changing circumstances. As illustrated at 270 in FIG. 2, each notification message sent from a device to the server includes not only its own ID value (the Requester ID) and the ID value of the newly arrived other device (the Identified ID), but also a Threshold value indicating the current willingness of the requestor to receive notification messages. By transmitting a threshold value of zero, a user indicates that the user desires to receive an alert for all newly arriving devices. By transmitting a maximum threshold value, a user may inform the server that no alert messages are to be sent to that user until a lower threshold value is sent.

Each time a requesting device sends a notification message to the server, its current threshold value is reset. This last entered value may be used to determine whether or not to send an alert message when another device sends a notification message indicating the proximity of two devices. When the server calculates a server score, it is compared with the currently stored threshold level of each identified device to determine whether or not to send an alert message to that identified device.

As shown in FIG. 2 at 260, the profile database contains, for each Bluetooth device: (a) the Bluetooth identification value BTID for that device; (b) a password which is used to authorize subsequent changes to the profile database; (c) a short name for the device or its user (which need not be same name as the "device name" stored in the Bluetooth device); (d) contact information such as mailing address, email address, web site URL, fax numbers, and importantly, the cellular phone number of the device, etc.; (e) demographic information describing the device or user, such as age, sex, religion, ethnicity, height, weight, or any other values which are of use in performing desired matching functions; data describing the "interests" of the device user, which can be used both to describe the user and/or to describe the attributes of interest in another participating user; (f) weighting values associated with individual items of demographic or interest data indicating the level of importance that user attached to each category of data; and (f) other preference data indicating, for example, the extent to which other information is the profile is sharable, and under what circumstances. In a given application, only a limited subset of these possible profile data categories is used, and the kinds of information that will be useful can be expected to vary significantly from application to application. In addition, as noted below, the user can control the kinds of information that are consulted in calculating a similarity score by changing the mode value associated with the threshold value.

An incoming notification/request message from a participating Bluetooth device received by the server 220 as indicated at 275 may consist of the Bluetooth identification values of the requesting device and another device whose proximity was detected, along with a current mode/threshold value which is generally indicative of the requesting user's willingness to receive alert messages. The two BTID values are used to fetch corresponding profile data from the database 260 and these profiles are compared as indicated at 280. The comparison yields a similarity score value indicating the degree of the two profiles match. If the similarity score value exceeds the thresholds for one or both devices as indicated by the test at 290, an alert message is sent to one or both devices as indicated at 295.

By way of example, the comparison might sum the weight values the requestor has assigned to matching "interest" entries in the two profiles, and if the computed sum exceeds the threshold value provided by the requester in the request message 270, an alert would be issued for that requester. The following routine, expressed as a Pascal procedure, illustrates one way of comparing the profiles of the requesting and identified devices:

---
Example comparison program
---

```
Type
    Interest = record
        Category: integer;
        Weight: integer
    end;
var
    Requestor_threshold, Identified_threshold: integer;
    Requestor_Interests, Identified_interests: array[1..8] of Interest;
procedure compare_profiles;
var i,j,k: integer;
begin
    k:=0;
    for i:=1 to 8 do if(requestor_Interests[i].weight > 0) then for j:=1
    to 8 do
        if requestor_Interests[i].category = Identified_interests[j].category
        then
            inc(k, Requestor_Interests[i].Weight +
            Indentified_interests[j].Weight);
    k:=normalize(k);
    if (requestor_threshold < maxint) and (k > requestor_threshold) then
            send_alert(requestor);
    if (identified_threshold < maxint) and (k > identified_threshold) then
            send_alert(identified);
end; { compare_profiles }
```

In the example program above, the stored profile information for both the requestor and the identified devices includes the specification of up to eight interest categories, each of which is specified by an integer value. Each device further specifies a weight value associated with each interest category. The procedure compare profiles forms a sum of the weight values which the requestor and the owner of the identified device have assigned to each matching category. After the weights are summed, the resulting sum is normalized. Normalization may be performed by dividing the calculated sum by the maximum sum that would be produced if all attributes were matched, and then multiplying the resulting quotient by the largest threshold value (less than maxint) that the user may enter. The normalization step allows the user to enter a threshold number that indicates an overall willingness to receive alert messages without regard to the relative importance assigned to various attributes.

Each user may request that no alert messages be sent to their device by setting their threshold value to the maximum value (maxint). Likewise, each user may request that alert messages whenever a new discoverable device comes within range by setting their threshold value to zero. Otherwise, alert messages will be sent to a given user's device only when the computed commonality value (k) exceeds the threshold level for that device. Thus, one, both or neither devices will receive an alert message, depending upon the threshold values each has submitted.

Note that each device may update its threshold level each time it sends a notification message advising the server that a new discoverable device has come within range as illustrated by the notification message record seen at 270 in FIG. 2.

The profile data for each user may advantageously include data specifying a set of device IDs for devices owned by "friends." The server may then identify persons who are "friends of friends" or "friends of friends of friends". A given user may then request that alert messages be sent only when such a "trusted" person having common interests is nearby. Moreover, the alert message may contain an identification of mutual friends, providing an easy way to start a conversation: "So, I guess we both know Alice Green . . . " Like other profile attributes, a user may assign a weight to the "friend list" data to indicate the relative importance that should be assigned to the fact that an encountered person may be a friend of one or more friends.

Each user may also set the extent to which information will be provided to requesters. For example, a user may indicate that interest categories may be revealed to others, but not name and address information. The degree to which information is revealed by be varied by transmitting a threshold value which contains not only an indication of the extent to which profiles should match but which also contains a "mode" value for the device. The mode value may indicated vary the content of the profile data which is communicated to others in alert messages or requested from the server by a device which has another device's Bluetooth ID in its devices log. Thus, a person attending a tradeshow may place his device in a mode which freely provides name and address information to others, whereas that same person may wish to withhold substantially all profile information in a less protected environment, like an airport.

An alert message may contain the cellular phone number of a nearby cellular telephone which is associated with a person having similar interests. This enables one user to simply call nearby person's cell phone, a feature that can be of particular utility in crowded areas in which it may be difficult to identify the other person using a displayed photograph sent with the alert message.

It may be desirable to suppress the transmission of either notification messages or alert messages in certain locations. For example, it might be desirable to suppress the generation of alert messages from all devices that are carried into a theater in which presentation is in progress. This can be accomplished by placing one or more Bluetooth "suppressor beacon" devices in or around that location. When any device is within range of one of the suppressor beacons, it sends its Bluetooth ID and the beacon's ID to the server. When the server receives an indication from a given device that it is within range of a suppressor beacon, the server inhibits the transmission of alert messages to that user's device until it is again out of range of the suppressor beacon.

Certain trusted devices may have profile information attributes set that entitle them to receive profile data from the server relating to a nearby individual that would not be available to the general public. These devices can act as remote extensions of the server. By way of example, the invention might be used to encourage communications between attendees and exhibitors at a trade show, and a device at a registration desk may be used to automatically obtain bibliographic data from the server that describes an arriving attendee in order to facilitate the registration process.

Similarly, it may be desirable to transmit an alert message to users containing certain information whenever they come within range of a particular beacon device. Thus, for example, attendees at a trade show may receive special instructions or announcements whenever they come within range of a greeting beacon near the entrance to the show. In this case, the alert message would be sent even though the device holder had submitted a high threshold value to inhibit alert messages when devices carried by other participants came within Bluetooth range. By equipping physical infrastructure with embedded computing and a Bluetooth transceiver, human users can be notified of nearby resources or facilities, such as an approaching free taxi, or a nearby public restroom. Devices might also be carried by mobile platforms with embedded computers (e.g., trucks, buses. For instance, busses could wait until passengers from other busses had gotten on-board, or delivery vehicles could more efficiently service pickup/drop-off requests.

Applications

The invention may be used to allow attendees at a particular event who have common interests to more easily find each other and communicate face-to-face. To that end, the participants at the event may be asked to use a web interface to submit profile data in advance of the event, selecting particular topics of interest from a category list that identifies predetermined job or subject categories. For example, a device carried by an attendee at trade show may specify profile data designed to put the attendee in contact with experts in a particular field. Salesmen can create a public profile to publicize their products and expertise. Similarly, people attending a gathering of "singles" may seek a person of the opposite sex of a particular age having common interests. A mode indicator value transmitted with the threshold value may be used to select different profile data for use in different situations. Thus, the same user may supply profile data for use in professional encounters, and other profile date for use in social encounters.

The invention may also be used to provide "situated introductions" when users of personal computer based "social software" programs come into direct contact. By way of example, the profile data already stored in systems such as Friendster.com, Match.com, and the like could be processed at a server to enable participants in those services to be introduced to one another when each is carrying a suitably programmed Bluetooth cell phone and comes within range of one another participant in that service. Such services normally require users to be in front of a computer in order to make new acquaintances, but the present invention allows these matching applications to be embedded directly into everyday social settings: on the bus, around the water cooler, in a bar, at a conference. Using telephone hardware technology that is already widely deployed, the present invention distinguishes and characterizes individuals, and thus enables serendipitous social interactions. As computing breaks free of the desktop and firmly roots itself in daily life, there is an emerging opportunity to mine, mediate, and augment today's social reality.

Bridging social software introduction systems with current mobile phone technology enables a diverse suite of applications. Since the needed device application software can be readily ported to the majority of phones today, conference participants can find the right people during the event. Large companies interested in facilitating internal collaboration can use the invention to introduce people who are working on similar projects, but not within one another's social circles.

Single individuals can more easily and more safely find and meet people of potential interest. The growth of online dating has soared over recent years as the stigma associated with personal ads diminishes. The present invention provides these users an alternative to dyadic encounters with strangers online, as well as approached by strangers about whom nothing is known. The system allows for a large variation in the privacy constraints for these applications. Phones can be set in invisible mode so that they will never be contacted, but they can still see other people's 'public profiles' and view information indicating what they have in common. A device can also be set to only establish potential links to others within a 'trust network'. Users become part of a trust network when they are within one degree from an individual's social circle, i.e.: a friend-of-a-friend. Trust networks can be expanded to incorporate several degrees should the user desire. Finally, a user can have the option of setting his or her profile to 'public'. This will allow other service participants to view this person's information. The public profile can be different from the main profile and can be viewed as a type of proximity webpage.

Being able to infer relationships between people based on proximity and interaction behaviors will augment a variety of existing services that currently require users to manually quantify existing relationships. Devices can be implemented that are not only aware of each other, but are also infused with a sense of social curiosity. By continually monitoring proximity data, the phones and the server which connects them can begin to learn patterns in an individual's behavior. This enables inferences to be made regarding whom the user knows and the type of relationship between everyone in their social network. Time regularly spent with an individual typically implies some type of relationship with them. The inference drawn as to the relationship type should take time and location into account. Friday evenings at bar should imply a different relationship than Tuesday afternoons in a meeting room. Thus, by processing proximity data, a given user's profile may be further populated with inferred data, such as one or more automatically created lists of likely friends and acquaintances that can be used to create a trust network as noted above.

The present invention further contemplates the use of body-worn personal area wireless networks and mobile phone usage to map the trade-offs between face-to-face interactions and telephone interactions. This is useful for managing companies' meeting spaces and communications infrastructure. An example is automatic verification and updating of workgroup membership and automatic configuration of push-to-talk phone networking. Currently, considerable expenditures are made using the services of PwC and the like to analyze a client's internal communication structure and recommend changes. Most large organizations see this category of problem as a primary barrier to success, both for current productivity and for reorganization planning. For PwC and others, the only way to gather data about face-to-face interactions has been through surveys, which are expensive, infuriating, and famously inaccurate. The present invention provides a tool to automatically collect accurate data with no additional capital expenditure or administration cost.

CONCLUSION

It is to be understood that the methods and apparatus which have been described above are merely illustrative applications of the principles of the invention. Numerous modifications may be made by those skilled in the art without departing from the true spirit and scope of the invention.

What is claimed is:

1. Apparatus for facilitating direct communications between persons having similar interests comprising, in combination, a long range communications network, a plurality of portable electronic devices, each given one of said portable electronic devices comprising:

a short range radio transmitter for transmitting a unique identification code value that identifies said given one of said devices, a short range radio receiver capable of detecting and storing received identification code values transmitted by other ones of said devices that are nearby, a long range communications interface coupled to said long range communications network comprising:

a long range transmitter responsive to the detection and storage of a newly received identification code value by said short range receiver for transmitting a notification message over said long range communication network, said notification message including said newly received identification code value and the unique identification code value identifying said given one of said electronic devices, a long range receiver for receiving an alert message transmitted to said given one of said portable electronic devices via said long range communication network, and a display screen for displaying information contained in said alert message to the user of said given portable electronic device, and a server connected to a long range communication network, said server comprising:

a database for storing profile data which describes each of said devices or one or more users of each of said devices, a message receiver coupled to said long range communications network for receiving one or more notification messages from said devices, a comparator responsive to the reception by said message receiver of a notification message containing identification code values identifying first and second nearby ones of said portable electronic devices for comparing the profile data in said database that describes said first portable electronic device with the profile data in said database that describes said second portable electronic device to produce a calculated value indicating the extent to which the profile data describing said first and second portable electronic devices are similar, and a message transmitter coupled to said comparator for transmitting an alert message via said long range communications network to said first portable electronic device when said calculated value exceeds a predetermined threshold value, said alert message containing displayable information derived from the profile data in said database that describes said second portable electronic device.

2. Apparatus as set forth in claim 1 wherein said short range radio transmitter and said short range radio receiver employ the Bluetooth protocol and said unique identification code is the Bluetooth device address of said given one of said devices.

3. Apparatus as set forth in claim 1 wherein each given one of said devices further includes a memory for storing recently received identification code values and wherein said means for transmitting one or more notification messages transmits a notification message when an identification code value newly received by said receiving means does not match any of said recently received identification code values in said memory.

4. Apparatus as set forth in claim 1 wherein one or more of said notification messages contains a mode indication value that characterizes the current operating mode of said given one of said devices.

5. Apparatus as set forth in claim 1 wherein said profile data comprises, for each individual one of said devices, the unique identification code value that identifies said individual one of said devices and further comprises attribute data that describes said individual one of said devices or one or more users of each of said individual one of said devices.

6. Apparatus as set forth in claim 5 wherein said profile data further comprises, for each individual one of said devices, preference values which indicate the desired characteristics of other ones of said devices as specified by the profile data stored in said database for said other ones of said devices.

7. Apparatus as set forth in claim 1 wherein said server further includes means coupled to said message receiver for processing incoming proximity data in said notification messages identifying nearby devices to create and store data in said database that indicates inferred relationships between at least some of said devices or their users.

8. Apparatus as set forth in claim 7 wherein said data that indicates inferred relationships includes data identifying likely friends and acquaintances of users of said devices.

9. Apparatus as set forth in claim 8 wherein said data that indicates inferred relationships is employed to establish a network of trust between devices or their users.

10. Apparatus as set forth in claim 7 wherein said profile data includes list data which identifies devices owned by friends of the owner a specified device and wherein said means for processing incoming proximity data adds devices which are frequently near to said specified device to said list data to create said inferred relationships.

11. Apparatus as set forth in claim 1 wherein said profile data includes data describing the interests of the users of said devices.

12. Apparatus as set forth in claim 11 wherein said new alert message contains displayable data indicating common interests shared between the users of said two nearby devices.

13. Apparatus as set forth in claim 1 wherein said profile data includes demographic or bibliographic data describing the users of said devices.

14. Apparatus as set forth in claim 1 wherein said server further includes means for accepting a command from a user said given one of said electronic devices which specifies the predetermined threshold level that determines when alert messages are sent to said given one of said electronic devices.

15. Apparatus as set forth in claim 1 wherein said new alert message contains image data representing a photograph or icon depicting said other nearby device or the user of said other nearby device.

16. Apparatus as set forth in claim 1 wherein said alert message contains displayable data representing a photograph or icon depicting said other nearby device or the user of said other nearby device.

17. Apparatus as set forth in claim 1 wherein said two nearby ones of said devices are cellular telephones and wherein said new alert message sent to one of said two nearby devices contains the telephone number of the other of said two nearby devices.

18. Apparatus as set forth in claim 1 wherein said database for storing profile data includes data employed by an existing Internet social networking service for matching the users of that service.

19. Apparatus as set forth in claim 1 wherein said apparatus further comprises a web server for accepting at least part of said profile data submitted by users of said devices via the Internet.

* * * * *